(12) United States Patent
Pala et al.

(10) Patent No.: US 7,675,428 B2
(45) Date of Patent: Mar. 9, 2010

(54) ROTATING GAUGE POINTER AND LIGHT GUIDE BETWEEN LCD AND LED

(75) Inventors: Silviu Pala, Birmingham, MI (US); Reben Werman, Sterling Heights, MI (US)

(73) Assignee: DENSO International America, Inc., Southfield, MI (US)

( * ) Notice: Subject to any disclaimer, the term of this patent is extended or adjusted under 35 U.S.C. 154(b) by 254 days.

(21) Appl. No.: 11/655,828

(22) Filed: Jan. 19, 2007

(65) Prior Publication Data

US 2008/0174416 A1 Jul. 24, 2008

(51) Int. Cl.
*G08B 5/24* (2006.01)

(52) U.S. Cl. ............. 340/815.78; 340/461; 340/815.58; 116/284; 116/288; 116/300

(58) Field of Classification Search ............ 340/815.78, 340/815.58, 461; 116/286, 298, 300, 284, 116/288; 345/156; 324/166
See application file for complete search history.

(56) References Cited

U.S. PATENT DOCUMENTS

| | | | | |
|---|---|---|---|---|
| 3,807,350 A | * | 4/1974 | Powell | 116/300 |
| 4,179,938 A | * | 12/1979 | Schramm | 73/510 |
| 4,435,795 A | * | 3/1984 | Frank | 368/16 |
| 6,215,298 B1 | * | 4/2001 | Westberg et al. | 324/166 |
| 6,270,250 B1 | * | 8/2001 | Song | 368/281 |
| 7,343,687 B2 | * | 3/2008 | Baba et al. | 116/286 |
| 7,369,044 B2 | * | 5/2008 | Ono et al. | 340/461 |

* cited by examiner

*Primary Examiner*—Davetta W Goins
(74) *Attorney, Agent, or Firm*—Harness, Dickey & Pierce, PLC

(57) ABSTRACT

An indicating instrument for a vehicle may employ an analog type lighted pointer arranged on a rotatable, circular shaped pointer disk, a liquid crystal display arranged over the pointer disk, and a first dial with indicia located outboard of or adjacent to and/or inboard of the LCD. A second or inboard dial may be located over the liquid crystal display. The pointer disk may be a translucent light collector for the pointer yet also transmit light to provide backlighting for the LCD. Depending upon the analog gauge arrangement, the pointer may point outboard of the pointer disk or toward the LCD center. The dials, especially the second dial, may be in the shape of rings to permit viewing of the LCD from the perspective of a viewer, such as a vehicle driver.

16 Claims, 4 Drawing Sheets

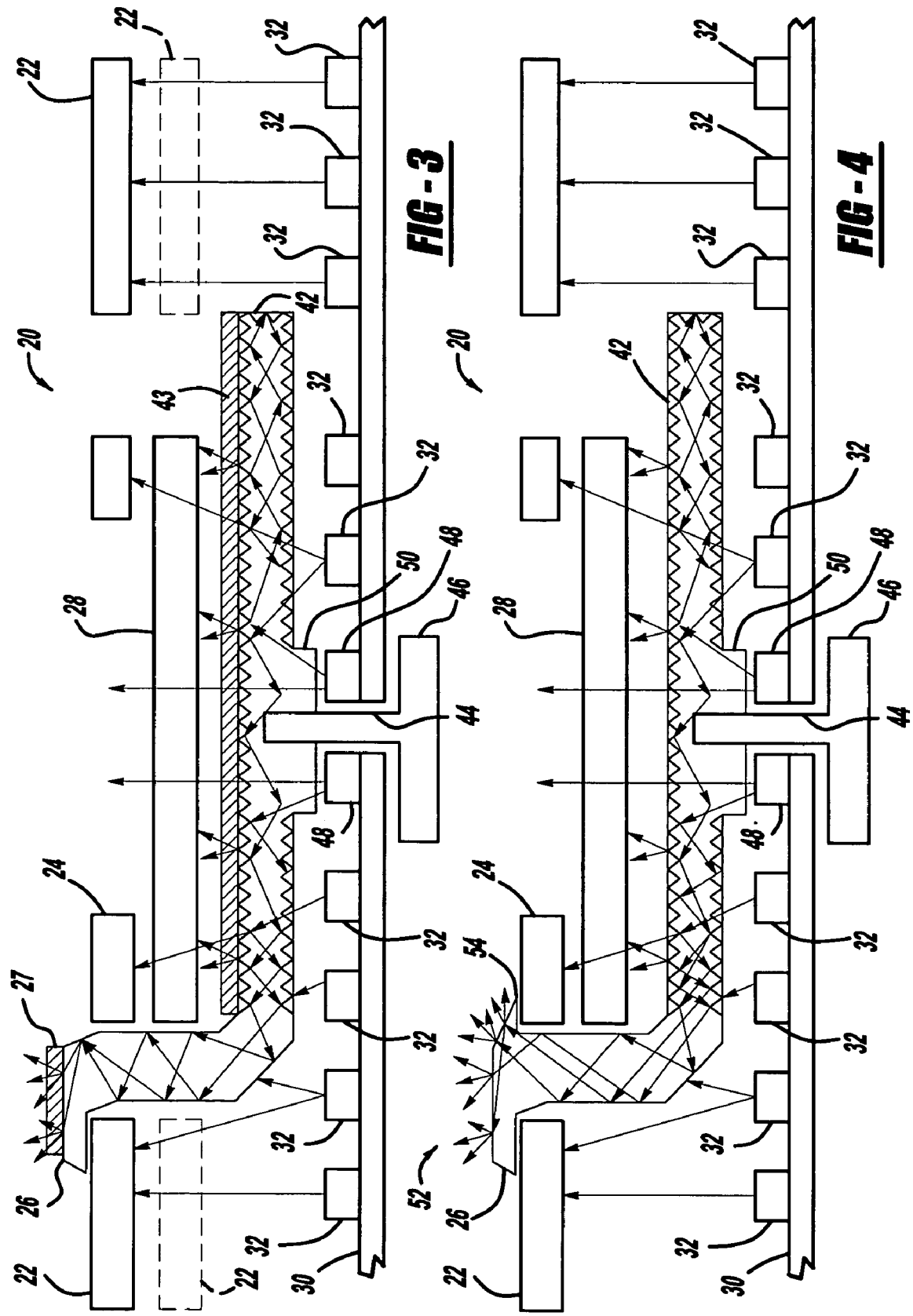

US 7,675,428 B2

ROTATING GAUGE POINTER AND LIGHT GUIDE BETWEEN LCD AND LED

FIELD

The present disclosure relates to a rotating gauge pointer and a light guide that rotates between a liquid crystal display and a light source.

BACKGROUND

The statements in this section merely provide background information related to the present disclosure and may not constitute prior art. Indicating instruments or gauges for viewing by drivers of automobiles generally include an analog portion for displaying operational information such as vehicle speed and engine RPM and, in more recent technologically advanced vehicles, a liquid crystal display for displaying information related to vehicle operating condition such as fuel efficiency, outside temperature, engine functions, and other information related to driving or vehicle conditions. An analog gauge typically includes a faceplate having indicia thereon such as numbers and a pointer for rotating to the appropriate number. While such analog indicating instruments and liquid crystal displays have generally proven satisfactory for their intended purposes, they have been associated with their share of limitations.

One such limitation of current vehicles with both analog and liquid crystal display devices is their packaging requirements. Because such devices are normally located in separate locations on a vehicle dash, extensive amounts of space are normally required in a dash. This generally leaves little packaging space for other gauges, such as temperature, fuel, and engine RPM gauges.

Another limitation of current vehicles with both analog and liquid crystal display devices is also related to vehicle packaging. More specifically, because incorporating analog and LCD devices within a vehicle dash presently means locating such devices in separate areas of the dash, even if they are adjacent to each other, the time necessary to view both, the analog and digital gauges, and the human movements required to view both, may be cumbersome for a vehicle driver.

What is needed then is a device that does not suffer from the above disadvantages. This, in turn, will provide an analog and an LCD device that is quickly and easily discernible in a short amount of time and that does not require extensive head or eye movements by a viewer of the gauges.

SUMMARY

An indicating instrument, such as a speedometer gauge, may employ a pointer arranged on a rotatable pointer disk, a liquid crystal display arranged over the pointer disk, a first dial located outboard of the liquid crystal display, and a second dial located over the liquid crystal display. The pointer disk may be a translucent light collector for the pointer, provide consistent, even lighting to the adjacent liquid crystal display, and transmits light to backlight the liquid crystal display. Depending upon the installation requirements of the indicating instrument, the pointer may point outboard of the pointer disk, inboard of the pointer disk, or be a dual pointer, and point outboard and inboard to respective scales. Regardless of the application, the liquid crystal display is viewable by a person viewing the instrument.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a cross-sectional view of the indicating instrument of FIG. 2;

FIG. 4 is a cross-sectional view of an embodiment of the indicating instrument in accordance with the present invention;

DETAILED DESCRIPTION

Figure 1:
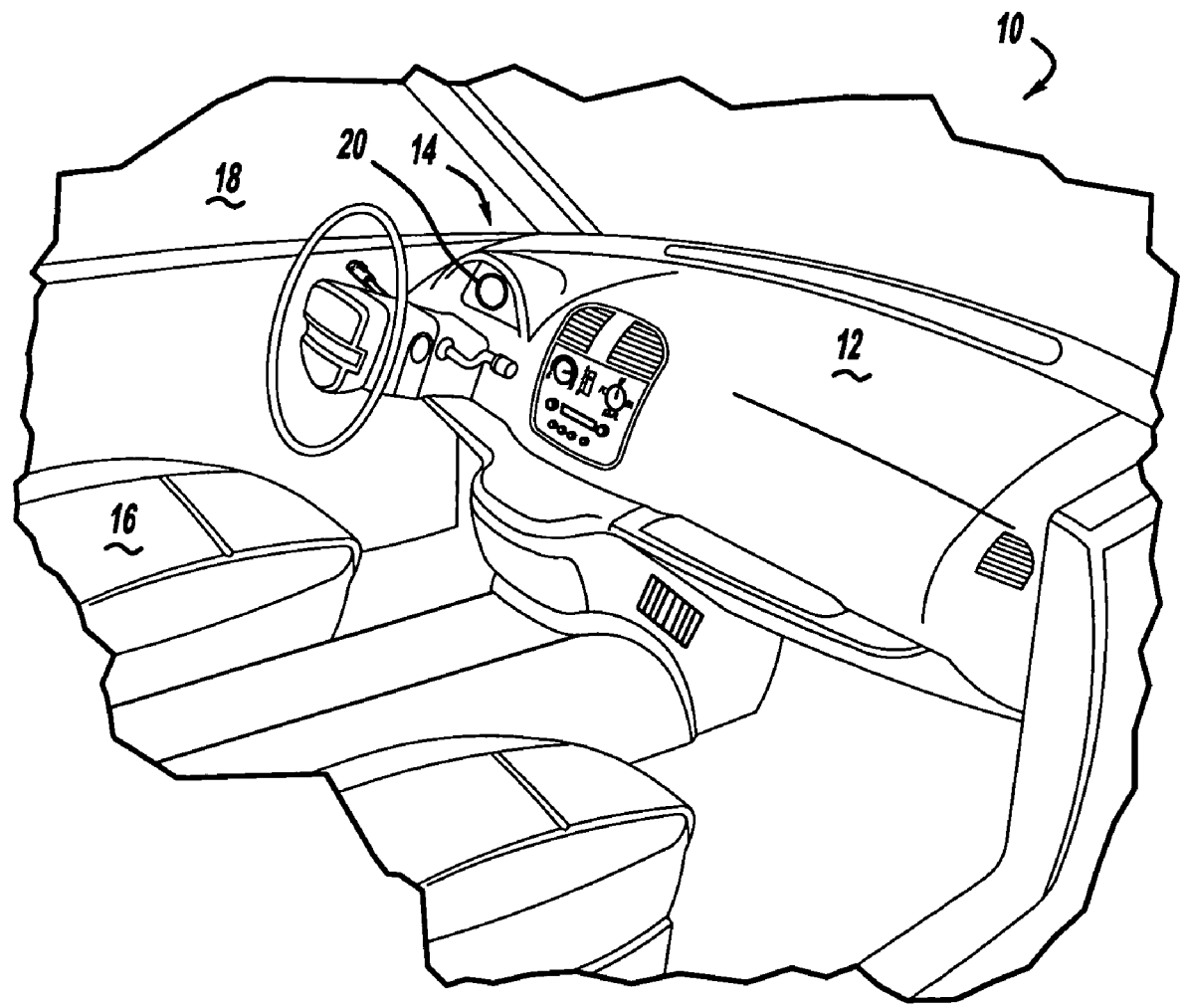
FIG. 1 is a perspective view of an interior dash of a vehicle depicting a location of an indicating instrument.

The following description is merely exemplary in nature and is not intended to limit the present disclosure, application, or uses. It should be understood that throughout the drawings, corresponding reference numerals indicate like or corresponding parts and features. Turning now to FIGS. 1-6, the teachings of the present invention will be explained. With initial reference to FIG. 1, depicted is a vehicle 10 having a dashboard 12 ("dash") and an instrument cluster 14, both of which may be situated in front of a driver's seat 16 in the interior cabin 18 of the vehicle 10. As part of the instrument cluster 14, a viewed component 20 is depicted and hereinafter, the viewed component 20 is exemplified by an indicating instrument or gauge, such as a speedometer. It is appreciated that the viewed component 20 may be exemplified by other gauges or instruments, such as a tachometer, fuel gage, temperature gage, etc.

Figure 2:
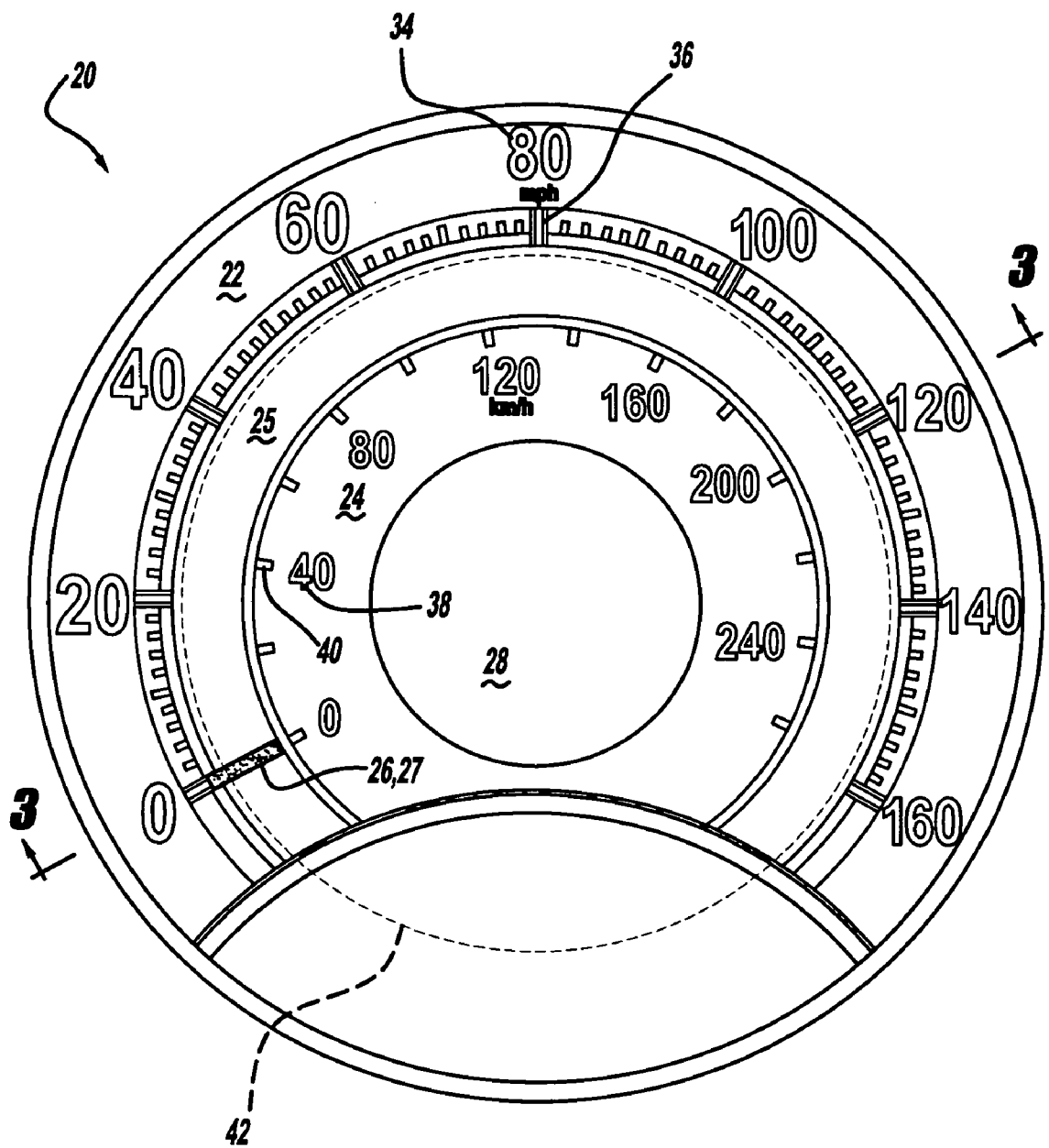
FIG. 2 is a front view of an indicating instrument constructed in accordance with an embodiment of the present invention.

Turning now to FIGS. 2 and 3, the speedometer 20 generally includes a first dial 22, a second dial 24, a pointer 26, a liquid crystal display 28 ("LCD"), a printed circuit board 30 ("PCB"), and a light source such as light emitting diodes 32 ("LED"). More specifically, the first dial 22 may denote miles per hour (mph) to a driver using indicia 34 and associated graduations 36 while a second dial 24 may denote kilometers per hour (km/h) using indicia 38 denoted by graduations 40. Such indicia 34, 38 and graduations 36, 40 may be spaced around their respective dial at a predetermined interval. As depicted in FIG. 2, the speedometer 20 is a typical US configuration insofar as the first dial 22 has mph indicia 34 that are larger than the corresponding Km/h indicia 38, which apply to countries using metric measurements, such as Canada.

Continuing with FIGS. 2 and 3, the speedometer 20 depicts an LCD 28 screen that may be rectangular, circular, triangular or other shape, as appropriate for the respective speedometer application. The pointer 26 is an indicating portion of the speedometer that is attached to a circular pointer disk 42 that is mounted to a spindle 44 that is driven by an electric motor 46. The motor 46 rotates the spindle 44, pointer disk 42 and associated pointer 26 so that the pointer 26 may indicate the correct speed at which a vehicle is traveling. In addition to acting as a portion of the pointer 26, the pointer disk 42 serves an additional role as a light collector for the LCD 28. More specifically, because the pointer disk 42 is situated between the PCB 30 and the LCD 28, the LEDs 32 of the PCB 30 provide the necessary backlighting for the LCD 28. To properly distribute and provide light to the LCD 28, the LEDs 32 may direct light rays into the pointer disk 42 such that the light is reflected within the pointer disk 42. While being reflected within the pointer disk 42, some of the light is reflected and directed to the pointer 26 to illuminate the pointer 26, while some of the light passes out of the pointer disk 42 and into the LCD 28 and becomes a source of light for the LCD 28. Depicted in FIG. 2, the area 25 of the pointer disk 42 may be a plated area for specific color enhancement, or opaque.

Regarding placement of the dials 22, 24 of the embodiments of FIGS. 3 and 4, the dial 22 may be considered to be above, below, or at the same level as the LCD 28. The dial 22 shown in phantom is depicted approximately at the same level as the LCD 28. The dial 22 is depicted outboard of the LCD 28, while the dial 24 is depicted over the LCD 28. The dial 66 of FIGS. 5 and 6, to be described in more detail later, may also be described as being over the LCD 28, much like the dial 24 of FIGS. 3 and 4. Additionally, the pointer disk 42, as depicted in FIGS. 2, 3 and 4, may have the plated area 25 about its periphery for color enhancement. Alternatively the area 25 may be opaque or no treatment may be applied to the pointer disk 42.

With continued reference to FIG. 3, light may pass into the pointer disk 42 in at least two ways; first, as discussed above, light from the LEDs 32 located under the pointer disk 42 may pass light into the pointer disk 42 and subsequently the LCD 28, and second, LEDs 48 may pass light into a pointer hub 50. In passing light into the pointer hub 50, the LEDs 48 may be situated directly under the pointer hub 50 such that light may pass directly through the hub 50 and pointer disk 42 and then into the LCD 28. To effectively reflect and transmit light through the pointer disk 42 en route to the pointer 26, the interior of the pointer disk 42 is equipped with a surface treatment 43, such as angled edges, textures or plated surfaces or layers, for example, that facilitate light reflectivity, light transmission and color changes or enhancements. The material of the pointer disk 42 may be acrylic or another plastic material that facilitates light reflection and transmission. Not only may the pointer disk 42 be equipped with a surface treatment 43, but the pointer 26 may also be equipped with a surface treatment 27, such as angled edges, textures or plated surfaces or layers, for example, that facilitate light reflectivity, light transmission or color changes or enhancements. Although such treatment areas 27 and 43 are only shown on FIG. 3, they may be applied to the structure of FIG. 4.

Turning to FIG. 4, an alternate embodiment of the invention is depicted. The embodiment of FIG. 4 is similar to that of FIG. 3; however, the embodiment of FIG. 4 depicts a dual pointer 52, which includes the primary pointer 26 as depicted in FIGS. 2 and 3, and additionally, a secondary pointer 54. The secondary pointer 54 may be used to more precisely point to secondary indicia 38, such as that on a second dial 24 as best depicted in FIG. 2. As with the pointer 26, the secondary pointer 54 is illuminated by the LEDs 32, 48 located under the LCD 28. An advantage of the dual pointer 52 as depicted in FIG. 4 is that two different scales may be simultaneously indicated without any portion of a pointer passing over or through a set of indicia, as commonly occurs with many current art pointers. That is, because may current art pointers originate in the center of a dial and pass over a first set of indicia to indicate a second set of indicia, the pointer obstructs part of the first set of indicia. With the dual pointer 52 depicted in FIG. 4, no indicia of any scale need be obstructed. In addition to the improved viewing of the indicia 34, 38, the embodiments depicted in FIGS. 3 and 4 provide a clear, unobstructed line of sight to the LCD 28.

Figure 5:
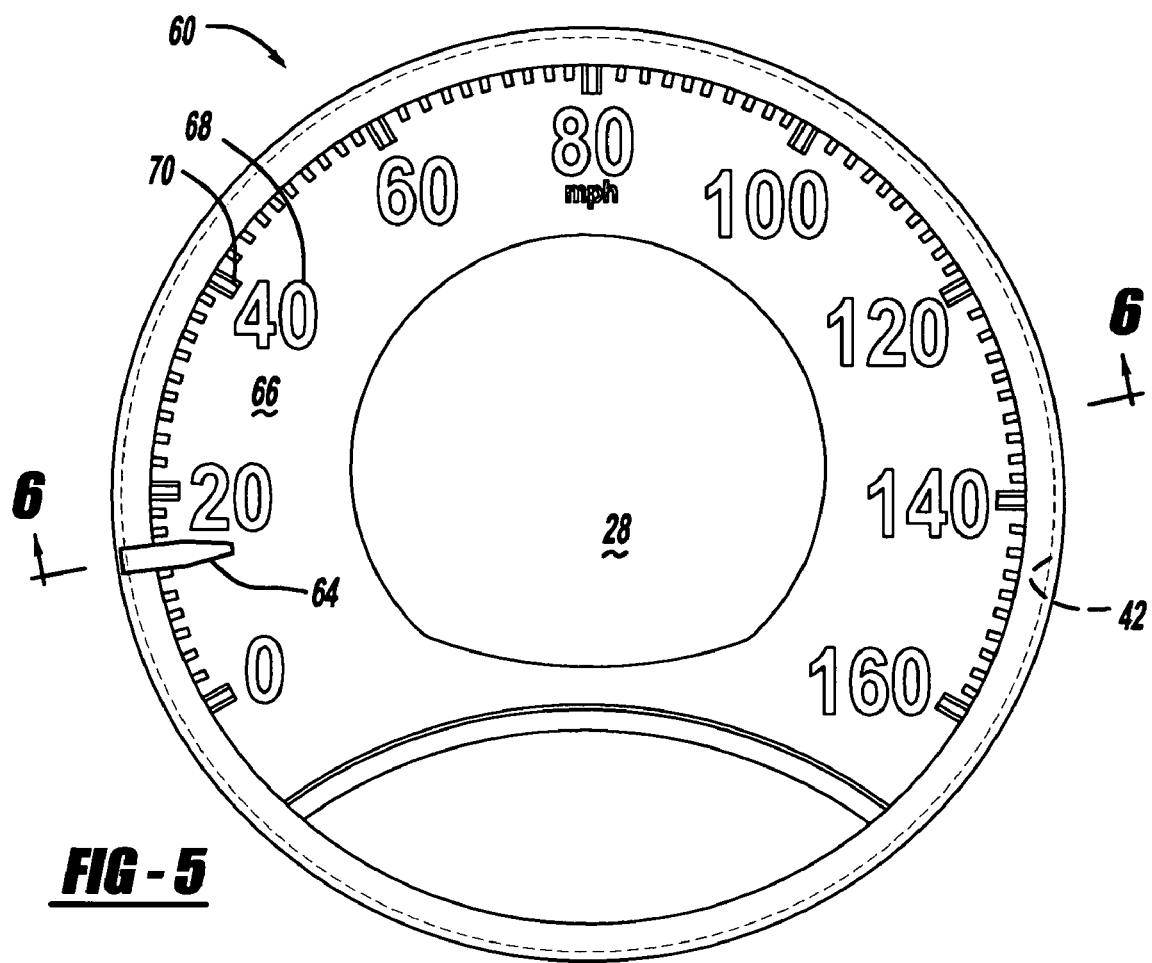
FIG. 5 is a front view of an indicating instrument constructed in accordance with an embodiment of the present invention.
Figure 6:
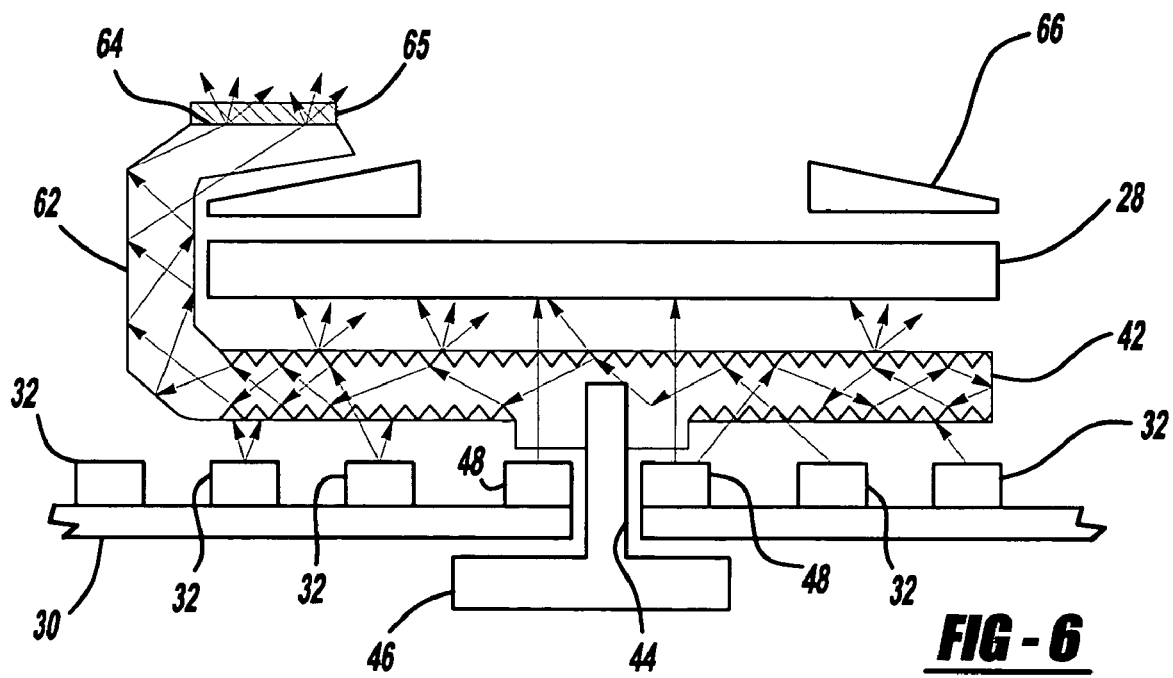
FIG. 6 is a cross-sectional view of the indicating instrument of FIG. 5.

Turning now to FIGS. 5 and 6, a speedometer 60 is again depicted as an example of a viewed component. The speedometer 60 has a U-shaped portion 62 extending from the pointer disk 42 that permits the pointer 64 to be directed toward a center portion of an LCD 28 and a surrounding dial 66. The dial 66 is a ring structure, which contains indicia 68 denoted by graduations 70, that is located over the LCD 28, yet permits viewing of the LCD 28 by a driver, for instance. The pointer disk 42 and LEDs 32, 48 function in a similar fashion to those of the embodiments of FIGS. 2-4; that is, light from the LEDs 32, 48 is permitted to pass into the pointer disk 42 en route to the end of the pointer 64 and additionally, light is permitted to pass out or through the pointer disk 42 to backlight the LCD 28. Additionally, light may pass to the dial 66 to illuminate any indicia 68 on the dial 66. Because the structure of FIGS. 5 and 6 utilizes a U-shaped portion 62 with the pointer pointing in an inboard direction (toward the center of the LCD 28), the overall gauge packaging may be made smaller, with a reduced overall diameter, than a gauge whose pointer points in an outboard direction (away from the center of the LCD 28), all else being equal. The pointer 64 may also be equipped with a surface treatment 65, such as angled edges, textures or plated surfaces or layers, for example, that facilitates light reflectivity, light transmission or color changes or enhancements. The pointer disk 42 may also have such a surface treatment as applied to the pointer 64.

There are many advantages to the embodiments of the present invention. First, because of the design and layout of the pointer disk 42 and LCD 28, the LEDs 32, 48 are able to serve as lighting for the pointers 26, 54, 64 and as lighting for the LCD 28 and adjacent dials. By using the LEDs 32, 48 in a dual or multi-function role, the number of LEDs may be reduced. Second, the pointer disk 42 serves as a light collector for the pointer 26. Because the pointer disk 42 serves as a light collector for the pointer 36 and because of its translucence may supply light to the LCD 28, the LCD 28 may not require another, supplemental, light source.

Still yet, another advantage of the embodiments of the present invention is that a compact gauge with an LCD may be provided. That is, the embodiments of FIGS. 1-6 provide a structure in which the LCD is positioned on top (with respect to the cross-sectional drawings) or in front (with respect to a driver's viewing perspective in a vehicle) of the pointer structure. Thus, with such a structure, the LCD does not need to be located separately from the workings of the pointer structure, which would require additional dash space. Additionally, the analog pointer will not obstruct the view of the LCD, and finally, with the embodiments of FIGS. 1-6, a structure results in which a centralized motor 46 may be used. With a centralized motor, there is no need for offset motors and associated gearing to drive a pointer or an affiliated indicator, and weight distribution of the pointer disk about the driving shaft of the motor may remain consistent.

What is claimed is:

1. In a vehicle dashboard, an indicating instrument comprising:
 a pointer arranged on a rotatable, circular pointer disk;
 a liquid crystal display arranged over and above the pointer disk, wherein the pointer disk is translucent and is a light collector for the pointer and the liquid crystal display;
 a first dial located outboard of the liquid crystal display; and a second dial located over the liquid crystal display, wherein the pointer passes between the first and second dials and the pointer disk is visible to a viewer between the first dial and the second dial.

2. The indicating instrument of claim 1, wherein the pointer points outboard of the pointer disk.

3. The indicating instrument of claim 2, wherein the pointer points inboard of the pointer disk.

4. The indicating instrument of claim 1, wherein the pointer disk has a rough surface to reflect light to the pointer.

5. The indicating instrument of claim 1, wherein the second dial defines a hole that reveals the liquid crystal display.

6. The indicating instrument of claim 1, wherein the pointer disk transmits light to backlight the liquid crystal display.

7. In a vehicle dashboard, an indicating instrument comprising:
- a pointer protruding from a rotatable, circular pointer disk;
- a liquid crystal display arranged over the pointer disk, wherein the pointer disk transmits light to backlight the liquid crystal display and the pointer is located only about a periphery of the liquid crystal display;
- a first dial located over and above the liquid crystal display, wherein the dial defines a hole and provides an unobstructed view of the liquid crystal display; and
- a second dial located outboard of the liquid crystal display, wherein the outer periphery of the pointer disk is visible between the first dial and the second dial.

8. The indicating instrument of claim 7, wherein the pointer is U-shaped.

9. The indicating instrument of claim 7, wherein the pointer disk transmits light to backlight the liquid crystal display.

10. The indicating instrument of claim 7, wherein the pointer disk transmits light to the pointer.

11. The indicating instrument of claim 7, wherein the pointer has a separate, plated surface for color enhancement.

12. In a vehicle dashboard, an indicating instrument comprising:
- a U-shaped pointer arranged on a rotatable pointer disk;
- a liquid crystal display arranged over and above the pointer disk, wherein the pointer disk captures light and transmits it through the U-shaped pointer, the rotatable pointer disk located under the liquid crystal display; and
- a dial located over and above the liquid crystal display, the dial defining a hole to permit viewing of the liquid crystal display through the hole, the U-shared pointer positioned around an edge of the liquid crystal display to indicate positions on the dial.

13. The indicating instrument of claim 12, wherein the pointer overlaps an outboard edge of the dial.

14. The indicating instrument of claim 12, wherein the pointer disk is textured to reflect light.

15. The indicating instrument of claim 12, wherein the dial has a separate plating surface for color enhancement.

16. The indicating instrument of claim 1, wherein the pointer always permits an unobstructed view of the liquid crystal display.

* * * * *